May 17, 1955 K. SCHLESINGER 2,708,687

COMBINED DIRECT CURRENT REINSERTER AND SYNCHRONIZING PULSE SEPARATOR

Filed May 10, 1949 2 Sheets-Sheet 1

Inventor
Kurt Schlesinger

By Foorman L. Mueller

Atty.

May 17, 1955

K. SCHLESINGER

COMBINED DIRECT CURRENT REINSERTER AND SYNCHRONIZING PULSE SEPARATOR 2,708,687

Filed May 10, 1949

2 Sheets-Sheet 2

Inventor
Kurt Schlesinger
By
Foorman L. Mueller
Atty 2,708,687
Patented May 17, 1955

2,708,687

COMBINED DIRECT CURRENT REINSERTER AND SYNCHRONIZING PULSE SEPARATOR

Kurt Schlesinger, Maywood, Ill., assignor to Motorola, Inc., Chicago, Ill., a corporation of Illinois Application May 10, 1949, Serial No. 92,395

3 Claims. (Cl. 178—7.3)

This invention relates generally to video coupling circuits and more particularly, to video output and control circuits such as used in television receivers.

In television receivers, it is necessary to provide high gain amplification of wide band video signals which include synchronizing elements and picture elements. To provide satisfactory reproduction both the synchronization elements and the picture elements should be amplified and reproduced without distortion. Also for proper reproduction the proper direct current axis must be established for the video signal. In picking up such signals by radio reception and in the high gain amplification required, various noises are introduced resulting in objectionable noise signals being superimposed on the video signals. Such noise not only produces distortion in the reproduced picture directly but also affects the synchronization of the receiver and interferes with circuits for direct current restoration so that additional indirect distortion is introduced thereby. It is desired that the circuit for coupling the video signal to the cathode ray tube be adjustable to provide varying contrast in the picture and that this adjustment be accomplished without interfering with the direct current axis or black level of the video signals.

It is, therefore, an object of the present invention to provide a video output circuit for a television receiver which provides a low impedance output from the high impedance video amplifier and which is effective to remove noise pulses from the video signal.

A further object of this invention is to provide a video output circuit which restores the direct current component of the video signal and which provides adjustable contrast control without affecting the black level of the signal.

A still further object is to provide a noise clipping device which operates on high level video signals so that the adjustment and operation thereof are not critical.

A feature of this invention is the provision of a cathode follower coupling between a video amplifier and a cathode ray tube for properly matching the video amplifier to the cathode ray tube.

A further feature of this invention is the use of a circuit operating from the output of a cathode follower which provides a bias to the video signal applied to the cathode follower for restoring the direct current component of the video signal, and so that the cathode follower may operate to remove noise pulses superimposed on the video signal.

A still further feature of this invention is the provision of a variable impedance connection between the cathode follower and the cathode ray receiver tube so that the contrast can be adjusted without changing the black level in the reproduced picture.

Further objects, features and advantages will be apparent from a consideration of the following description when taken in connection with the accompanying drawings in which.

In practicing the invention there is provided a television receiver having a high gain video amplifier for producing video signals of large amplitude. The video signals are applied to a cathode ray tube through a cathode follower circuit which provides the proper impedance match between the video amplifier and the cathode ray tube. The output signal from the cathode follower is applied to rectifying means which produces a voltage corresponding to the direct current component of the video signal. This voltage is applied to the input of the cathode follower and restores the direct current component of the video signal so that the cathode follower is effective to clip noise pulses which are superimposed on the video signal. A variable impedance coupling is provided between the cathode follower and the cathode ray tube for controlling the contrast of the picture, which coupling is arranged so that the black level of the picture remains fixed at all times.

Figure 1:
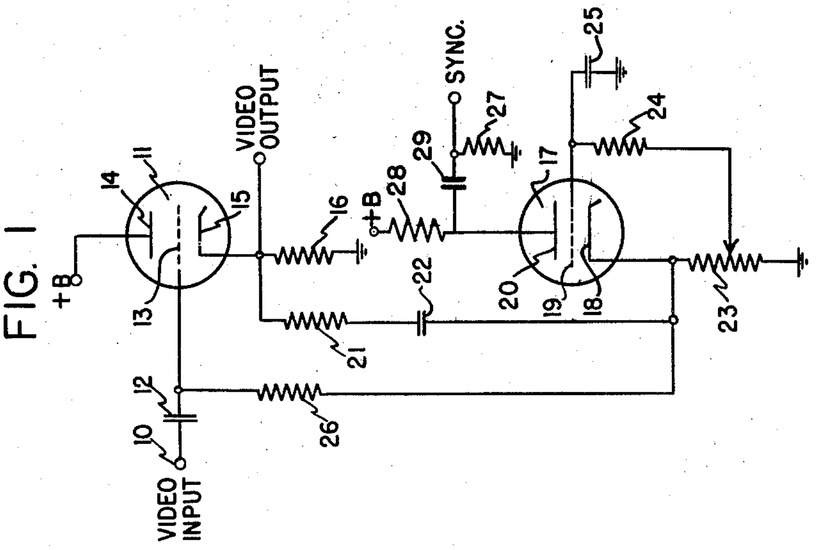
Fig. 1 is a circuit diagram illustrating the output circuit in accordance with the invention in simple form.
Figure 2:
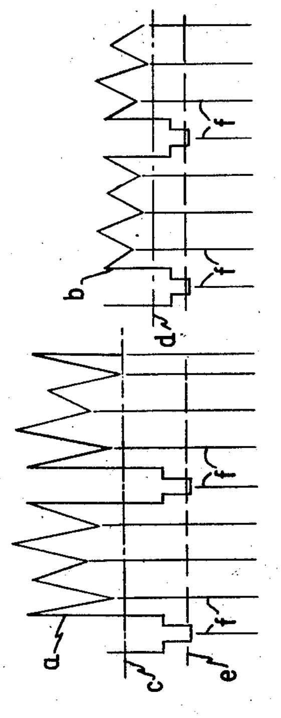
Fig. 2 is a chart illustrating the operation of the output circuit.

Referring now to the drawings, in Fig. 1 there is illustrated a simplified version of the output circuit in accordance with the invention. A high level video signal including synchronization pulses and picture elements is applied at the input terminals 10. Fig. 2 illustrates the form of the video signal applied to the terminal 10 with curves *a* and *b* illustrating signals of different amplitudes. This video signal is an alternating current signal having an alternating current axis as illustrated by the center lines *c* and *d* corresponding to the signals *a* and *b* respectively. This signal is applied through the coupling condenser 12 to the triode 11 which functions as a cathode follower. The cathode follower includes a grid 13 to which the signal is applied, a plate 14 connected to +B, and a cathode 15 connected to ground through resistor 16, across which the video output is derived.

Figure 3:
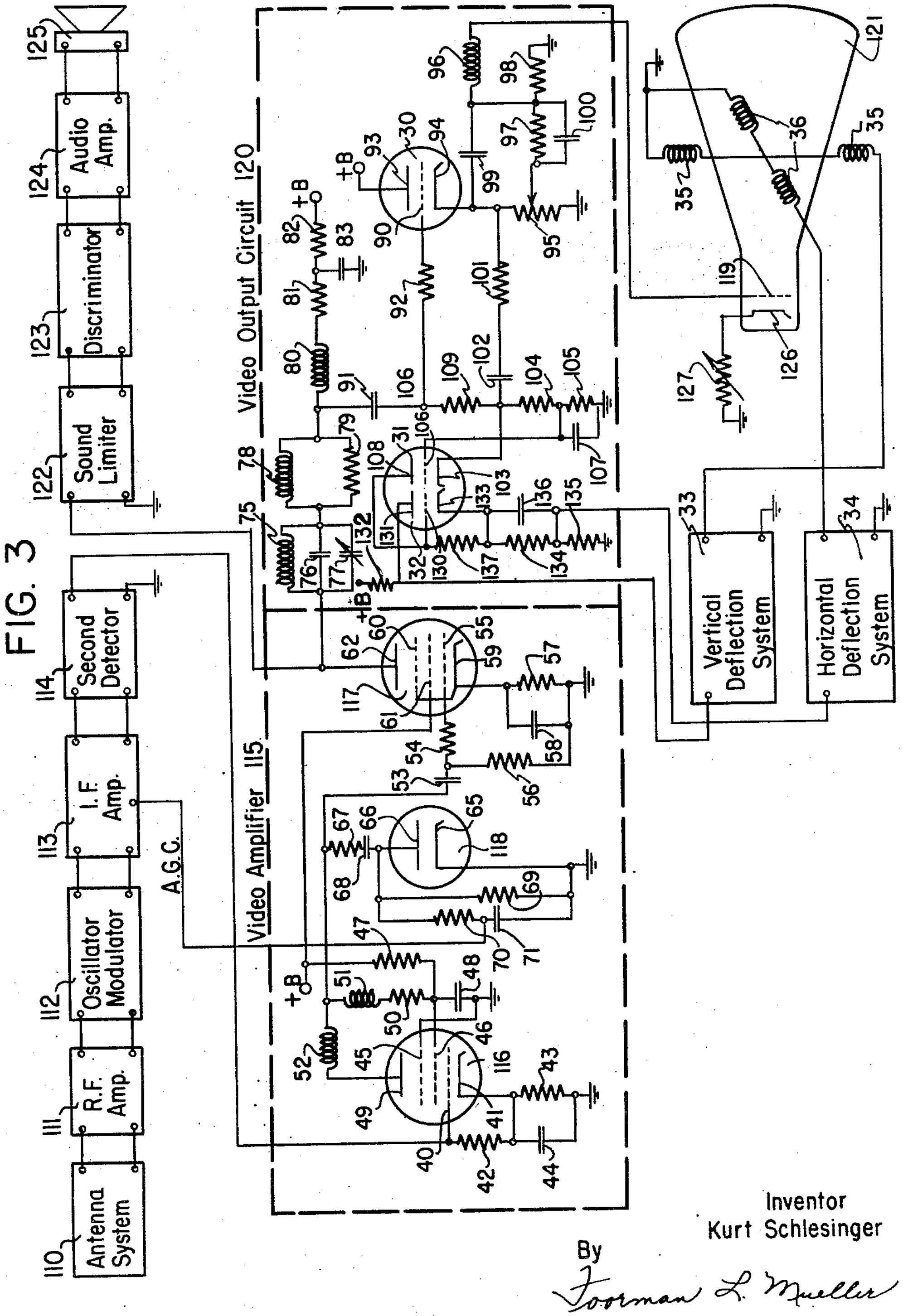
Fig. 3 is a schematic diagram illustrating the use of the coupling circuit in a television receiver.

For proper reproduction of the video signal, it is necessary that the direct current component of the signal be restored. This is accomplished in the triode 17 which serves the double purpose of providing the direct current component and also of deriving the synchronization pulses from the composite video signal. The triode 17 includes a cathode 18, a grid 19 and a plate 20. The video signal is applied from the output of the cathode follower through resistor 21 and condenser 22 to the cathode 18 of the triode 17. The cathode 18 is grounded through a potentiometer 23 having a movable tap connected to the grid 19 through the resistor 24. The grid 19 is bypassed by condenser 25. A positive potential is applied to the plate 20 and may be applied directly through a dropping resistor 28 as shown in Fig. 1 or through the succeeding stage as illustrated in Fig. 3. The grid-cathode circuit 19—18 of the triode 17 functions as a rectifier producing a voltage across the potentiometer 23 which varies in accordance with the direct current component of the video signal applied thereto. This direct current component is applied through resistor 26 to the grid 13 of the cathode follower to restore the direct current component to the signal applied thereto. The plate 20 of the triode 17 is grounded through resistor 27 with the sync pulses being derived across this resistor and available at the terminal marked "sync." When B plus potential is applied directly to the plate 20, a direct current blocking condenser 29 must be provided between the plate 20 and the resistor 27 so that the direct current potential will not appear across the resistor 27.

The cathode follower 11 functions as a clipper to remove noise pulses from the video signal. Noise pulses are represented by the spikes *f* on the signals *a* and *b* of Fig. 2. This clipping action is made possible by providing direct current restoration to the video signal before it is applied to the cathode follower. The resistor 16 in the cathode circuit of the cathode follower 11 and the resistor 23 connected between the grid 13 and ground are so related that the cathode follower is biased almost to cut-off for signals of zero voltage. The amplitude of the direct current component applied by the triode 17 can be controlled, as will be explained more in detail, and the video signal can be lifted thereby to the amount desired. For example, the direct current component may be of such amplitude that the signals are positioned so that zero voltage is represented by the dotted line *c* in Fig. 2. The peaks of the synchronization signals extend just below zero and the remainder of the video signal is above the zero voltage level because of the direct current bias provided by the triode 17. The video signal, therefore, is passed by the cathode follower and appears across the resistor 16. The noise pulses, however, extend below the zero level and are, therefore, clipped by the cathode follower.

The rectifying action of the triode 17 provides a direct current component for the video signal depending upon the strength or amplitude thereof. In the usual diode direct current restorers, the maximum bias obtainable would be less than the average amplitude and, therefore, the tips of the synchronization pulses could not be raised up to the zero signal level. Because of the direct current feedback arrangement which will be more fully described, a direct current component can be provided for the video signal greater than the average amplitude of the video signal so that the synchronization pulses can be raised to the desired level. The signal applied to the triode 17 is from the output of the cathode follower so that the noise pulses are removed from this signal. Therefore, the noise pulses will not affect the direct current component of the video signal which is derived by the triode 17.

The operation of the triode 17 to provide the desired amount of direct current restoration will now be described. It is apparent that when the tap on potentiometer 23 is at the bottom of the resistor, that is, at ground, the tube functions as a diode and the circuit is the standard diode restorer circuit. Such a circuit cannot completely restore the direct current component but will lift a video signal as illustrated in curve *a* of Fig. 2 so that the synchronization peaks will fall below the zero axis. However, when the tap is moved up along potentiometer 23 and a part of the cathode bias is applied to the grid 19, the cathode becomes more positive and the voltage across potentiometer 23 therefore increases. This action results as when the grid becomes positive the cathode must rise until its negative peaks just equal the grid bias. If the cathode fell below the grid bias, heavy grid current would flow which would cause the cathode to be more positive. By this feedback arrangement a direct current voltage which is greater than the direct current component of the video signal can be produced. By this circuit the video signal can be lifted so that the synchronization peaks are at the zero level or are above the zero level.

It is therefore seen that a unique overall result is produced by the cathode follower and the biasing triode. The biasing triode provides a bias to the signal applied to the cathode follower which automatically restores the direct current component thereto. The amount of bias can be accurately controlled and related to the bias on the cathode follower so that the cathode follower functions as a clipper. The clipping action of the cathode follower removes noise pulses from the signal and also smooths the sync tips. This latter action improves the synchronization signals and the synchronization of the scanning generators thereby. As the signal applied to the bias triode is from the output of the cathode follower, this signal has the noise pulses removed and therefore the direct current component is not affected by the noise pulses. As will be further explained the cathode follower also provides the desired impedance match between the video amplifier and the cathode ray tube, and the biasing triode in addition to providing the bias voltage also functions as the first stage of the synchronization signal clipper.

In Fig. 3 there is illustrated a television receiver utilizing the output circuit in accordance with the invention. The receiver includes an antenna system 110, a radio frequency amplifier 111, an oscillator modulator 112, an intermediate frequency amplifier 113, and a second detector 114. These elements may all be of standard construction and may operate in the usual way. Coupled to the second detector 114 is a video amplifier 115 which includes two tubes 116 and 117 for providing high gain and a rectifier 118 for producing an automatic gain control bias. The output of the video amplifier 115 is applied to the output or coupling circuit 120 which applies the video signal to the grid 119 of the cathode ray tube 121. The cathode 126 of the tube is grounded through variable resistor 127. The system illustrated is an intercarrier system in which the sound signal is amplified in the intermediate frequency amplifier and video amplifier along with the video signal. The sound signal is derived from the video amplifier 115 and applied to the limiter 122, discriminator 123, audio amplifier 124 and sound reproducer 125 which may be of standard construction and which operate in a well known manner.

The output circuit 120 includes a triode 30 which functions as a cathode follower and a second triode 31 which functions to provide a bias for the cathode follower 30 and also as the first stage of a clipper for deriving synchronization signals from the video signal. The triodes 30 and 31 correspond generally to the triodes 11 and 17 of Fig. 1. The triode 31 may be provided in the same envelope as a triode 32 which completes the clipping operation and provides synchronization signals for controlling the vertical and horizontal deflection systems indicated at 33 and 34 respectively. These deflection systems may provide deflection currents or voltages as the case may be and in the circuits shown provide currents for the vertical deflecting coils 35 and the horizontal deflecting coils 36 respectively, associated with the cathode ray tube 121.

Considering now the video amplifier 115 more in detail, the stages provided by tubes 116 and 117 are regenerative so that the amplification therein is linear. The tube 116 includes a control grid 40 to which the signal is applied, and which is biased with respect to the cathode 41 by resistor 42. The cathode resistor 43, bridged by a condenser 44, provides regeneration so that the gain of the tube is linear. The tube includes a grounded suppressor grid 45 and a screen grid 46 which is connected to B+ through resistor 47. Condenser 48 provides high frequency bias. B+ potential is also applied to the plate 49 of the tube 116 through resistor 47 in series with resistor 50 and inductors 51 and 52. The output video signal from tube 116 is applied through inductor 52, condenser 53 and resistor 54 to the control grid 55 of the tube 117. Bias is provided for the control grid by resistor 56. Degenerative action is provided by cathode resistor 57 which is bypasesd by condenser 58. The suppressor grid 60 is connected directly to the cathode 59 and the screen grid 61 is connected directly to B+.

As previously stated, the diode rectifier 118 provides a bias for automatic gain control. The diode includes a cathode 65 connected to ground and a plate 66 connected to the output of the first video amplifier stage through resistor 67 and condenser 68. A load resistor 69 is provided across the elements of the diode and the voltage across resistor 69 is applied to the intermediate frequency amplifier through resistor 70, with condensers 71 providing high frequency bypass. The operation of the automatic gain control diode is well known.

The output of the video amplifier is applied to the sound system being coupled directly to the sound limiter 122. The output of the video amplifier is also applied to the coupling circuit 120. The coupling circuit includes a filter network including inductor 75, condenser 76, variable condenser 77, inductor 78, and resistor 79 for blocking the intercarrier sound signal. Plate potential is provided for the plate 62 of the video amplifier tube 117 through the tuned circuit including inductor 80, resistors 81 and 82, and bypass condenser 83.

The coupling circuit 120 includes the cathode follower tube 30 having a grid 90 to which the video signal is applied through coupling condenser 91 and resistor 92. The plate 93 of the cathode follower is connected to +B and the cathode 94 is connected to ground through resistor 95 across which the video signal is developed. The resistor 95 is variable to provide contrast control. The variable output of the resistor 95 is connected to the grid 119 of the cathode ray tube through a network including resistors 97 and 98, condensers 99 and 100 and inductor 96. This network provides constant black level regardless of the contrast provided, in a manner to be described in detail hereinafter.

For restoring the proper direct current axis for the video signal, which was lost in the video amplifier, the triode section 31 is used. The video signal from the resistor 95 is applied through resistor 101 and condenser 102 to the cathode 103 of the triode section 31. A voltage divider including resistors 104 and 105 is connected to the cathode 103 with the intermediate point therebetween being connected to the grid 106 of the triode 31. Bypass condenser 107 is also connected to the grid. The plate 108 is grounded through a plurality of resistances. As described in connection with Fig. 1, rectifying action takes place in the triode 31 for providing a direct current voltage varying with the average amplitude of the video signal applied thereto. The voltage divider applies part of the DC bias of the cathode to the grid so that the cathode becomes more positive. This results in a voltage on the cathode which is greater than the average amplitude of the video signal. It will be apparent that the voltage on the cathode 103 is applied through resistor 109 to the input of the cathode follower so that the video signal is restored thereby prior to application to the cathode follower 30.

Although the components in the output circuit of Fig. 3, are slightly different than those illustrated in Fig. 1, the function thereof is identical. The resistors 104 and 105 form a voltage divider and provide a potential for the grid 106 in the triode 31. These resistors are equivalent to the potentiometer 23 in Fig. 1. The triode 31 therefore restores the direct current component to the signal applied to the cathode follower 30 with the amount of D. C. restored depending upon the relative values of the resistors 104 and 105. The cathode follower acts as a clipper to remove noise from the video signal and to smooth the sync peaks. The smoothing of the sync peaks is effective in the television system to straighten out the vertical lines of the television picture and therefore improve the reproduction. However, it is pointed out that in some instances it may be desired to have maximum sync pulses and in this case the direct current component applied to the video signal should be such that the sync peaks will be raised above the zero level and will not be clipped by the cathode follower.

The use of a cathode follower operating at the output of the video amplifier as a clipper to remove the noise pulses is particularly effective. This is because at this point relatively large voltages are involved and therefore the clipping action is not critical as if carried on prior to the amplification where small voltages are involved. In systems in accordance with the invention a voltage of the order of 60 volts is applied to the cathode follower and the synchronization signals are of the order of 10 to 15 volts. When operating a cathode follower at these levels, variation in the tube characteristics due to production tolerances, and changes in the B+ voltage do not adversely affect the operation. In the circuit disclosed the grid is biased by the signal and not by the supply voltage and therefore changes in the grid bias and corresponding changes in signal strength are not produced by variations in the supply voltage.

In the circuit of Fig. 3, the clipped synchronization signal is applied from the plate 108 of the triode 31 to the grid 130 of the triode 32. The triode 32 provides a second clipping action removing any remaining noise pulses from the signals. The plate 131 of the triode 32 is connected to +B through resistor 132 and the cathode 133 is connected to ground through resistors 134 and 135 with the resistor 134 being bypassed by condenser 136. The grid 130 is biased with respect to the cathode 133 by resistor 137. The voltage developed across resistors 134 and 135 is applied through resistor 137 to the plate 108 of triode 31 to provide a positive potential for the plate of this tube. Low frequency or field synchronization pulses are derived from the plate 131 and applied to the vertical deflection system 33 and high frequency or line synchronization pulses are applied to the horizontal deflection system 34 from the cathode 133 across the resistor 135.

Figure 4:
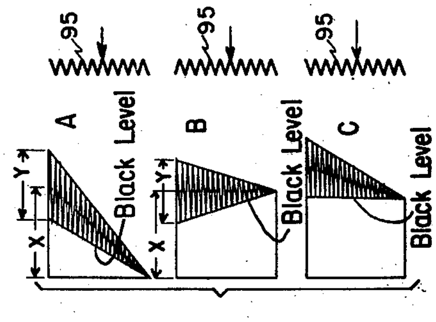
Fig. 4 illustrates the operation of the contrast control at constant black level.

As previously stated the video signal from resistor 95 is applied to the grid 119 of the cathode ray tube. In order to provide contrast control the resistor 95 is made variable so that the amplitude of the video signal can be adjusted. However, a simple potentiometer without other connection to the cathode resistor would provide variations in the direct current as well as the alternating current component of the signal. This is not desirable as it would result in variation in the black level of the picture. This is illustrated in Fig. 4 in which curve A shows the results which would be obtained by the resistor only. In curve A of Fig. 4, the direct current component and variations thereof corresponding to the position of the tap on the potentiometer 95 is indicated by the portion $x$ and the alternating current component is shown by the portion $y$ of the curve. This results in variations in the minimum amplitude of the video signal which corresponds to the black level. It is also not desirable to maintain the direct current component of the signal constant as shown in curve B of Fig. 4 as in this case the minimum amplitude of the video signal, which represents the black level, will again vary with the position of the variable resistor. In order to maintain the black level constant it is necessary for the direct current component to vary but at a lesser rate than the alternating current component. This is provided by the coupling illustrated in which the direct current component is taken from the tap on the resistor 95 and then divided by resistors 97 and 98 so that the variation is reduced. The alternating current component is derived through condensers 99 and 100 which are connected to the high voltage point of the resistor 95 and the tap thereon respectively.

The video output circuit described has been found to be highly satisfactory in actual operation. The noise clipping function of the cathode follower together with the D. C. restoration provided by the triode results in a greatly improved video signal for application to the cathode ray tube. The cathode follower also provides the proper impedance match between the high impedance video amplifier and the cathode ray tube and the output of the cathode follower provides constant black level for all degrees of contrast. As the direct current is restored from the video signal after noise clipping, the direct current component is not influenced by the noise signals. The amplified direct current restoration further improves the video signal which is applied to the cathode ray tube.

It will be noted that the output coupling circuit is very simple, requiring only a single triode which is designated in Fig. 3 as 30. The triode 31 which restores the direct current component also functions as the first stage of the clipper and therefore this tube is necessary in the television receiver whether or not the video output circuit is used. The circuit is not critical in operation and as previously stated, has proved very satisfactory in actual use.

While certain embodiments of the invention have been described herein, it is obvious that various changes and modifications can be made therein without departing from the intended scope of the invention as defined in the appended claims.

I claim:

1. A system for providing a direct current component for a composite television video signal having negative going synchronization pulse components including in combination, a translating stage for said composite video signal including a first electron discharge valve having an anode, a cathode and a control grid, first resistance means connecting said cathode to a reference potential and means for applying a potential positive with respect to said reference potential to said anode, condenser means connected to said control grid for applying only the alternating current component of said composite video signal to said control grid with the synchronization pulse components thereof being negative with respect to the remainder of said composite video signal, a rectifier circuit coupled to said translating stage for producing a direct current voltage which varies in accordance with the negative swing of said video signal with resepct to the alternating current axis thereof and which is greater than said negative swing, said rectifier circuit including a second electron discharge valve having a cathode, an anode and a control grid, second resistance means coupled between said cathode of said second valve and a reference potential, direct current means connecting said grid of said second valve to a point on said second resistance means intermediate said cathode of said second valve and said reference potential, first condenser means connecting said grid of said second valve to said reference potential, a coupling circuit for applying only the alternating current component of the video signal to said cathode of said second valve with said synchronization pulse components negative with respect to the remainder of the composite video signal to cause the conduction in said valve, said coupling circuit including third condenser means having one side thereof connected through direct current means to said cathode of said first valve and the other side thereof connected to said cathode of said second valve, means for applying a potential positive with respect to a reference potential to said anode of said second valve, said positive potential having a value so related to the value of the video signal applied to said cathode of said second valve that said second valve conducts only during the occurrence of said synchronization pulse components, and direct current coupling means connecting said resistance means adjacent said cathode of said second valve to said control grid of said first valve for applying the direct current voltage across said resistance means to said video signal at said control grid, with the direct current voltage across said second resistance means being increased by action of said grid of said second valve to a value which is greater than said negative swing of said video signal.

2. A system for providing a direct current component for a television video signal having negative going synchronizataion pulse components including in combination, a cathode follower circuit including a first electron discharge valve having a cathode, an anode and a control grid, said cathode follower circuit including first resistance means connecting said cathode of said valve to a reference potential and means for applying a potential positive with respect to said reference potential to said anode of said valve, condenser means connected to said control grid of said first valve for applying said video signal thereto, a rectifier circuit coupled to said cathode follower circuit for producing a direct current voltage which varies in accordance with the negative swing of said video signal with respect to the alternating current axis thereof and which is greater than said negative swing, said rectifier circuit including a second electron discharge valve having a cathode, an anode and a control grid, means for applying a potential positive with respect to said reference potential to said anode of said second valve, second resistance means coupled between said cathode of said second valve and said reference potential, direct current means connecting said grid of said second valve to a point on said second resistance means intermediate said cathode of said second valve and said reference potential, second condenser means connecting said grid of said second valve to said reference potential, a coupling circuit for applying only the alternating current component of the video signal to said cathode of said second valve with said synchronization pulse components being of a polarity to cause conduction in said valve, said coupling circuit including third condenser means having one side thereof connected through direct current means to said cathode of said first valve and the other side thereof connected to said cathode of said second valve, and direct current coupling means connecting said second resistance means adjacent said cathode of said second valve to said grid of said first valve for applying the direct current voltage across said second resistance means to said video signal at said grid of said first valve, with the direct current voltage across said second resistance means being increased by action of said grid of said second valve to a value which is greater than said negative swing of said video signal.

3. A system for providing a direct current component for a television video signal having negative going synchronization pulse components and for deriving the pulse components from the signal including in combination, a first electron discharge valve having a cathode, an anode and a control grid, means for applying a potential positive with respect to said reference potential to said anode of said first valve, first resistance means connecting said cathode of said first valve to said reference potential across which a positive potential is developed, a rectifier circuit for producing a direct current voltage which varies in accordance with the negative swing of said video signal with respect to the alternating current axis thereof and which is greater than said negative swing, said rectifier circuit including a second electron discharge valve having a cathode, a plate and a grid, second resistance means connecting said cathode of said first valve to said anode of said second valve for applying a potential positive with respect to said reference potential to said anode of said second valve, third resistance means coupled between said cathode of said second valve and said reference potential, direct current means connecting said grid of said second valve to a point on said third resistance means intermediate said cathode of said second valve and said reference potential, condenser means connecting said grid of said second valve to said reference potential, a coupling circuit for applying only the alternating current component of the video signal to said cathode of said second valve with said synchronization pulse components being of a polarity to cause conduction in said valve, said coupling circuit including second condenser means having a direct current connection from one side thereof to said reference potential and having the other side thereof connected to said cathode of said second valve, direct current coupling means connected to said third resistance means adjacent said cathode of said second valve for deriving the direct current voltage across said third resistance means, with the direct current voltage across said third resistance means being increased by action of said second valve to a value which is greater than said negative swing of said video signal, said anode of said second valve being directly connected to said control grid of said first valve for applying synchronization pulse components produced by conduction in said second valve to said first valve, and means coupled to said anode of said first valve controlled by said synchronization pulse components.

References Cited in the file of this patent

UNITED STATES PATENTS

| | | |
|---|---|---|
| 2,136,810 | Vance | Nov. 15, 1938 |
| 2,226,259 | Richards et al. | Dec. 24, 1940 |
| 2,227,026 | Schlesinger | Dec. 31, 1940 |
| 2,227,492 | Faudell | Jan. 7, 1941 |
| 2,246,331 | White et al. | June 17, 1941 |
| 2,254,114 | Wilson | Aug. 26, 1941 |
| 2,299,944 | Wendt | Oct. 27, 1942 |
| 2,302,425 | Deerhake | Nov. 17, 1942 |
| 2,307,249 | Willans | Jan. 5, 1943 |
| 2,307,375 | Blumlein et al. | Jan. 5, 1943 |
| 2,346,577 | Conklin | Apr. 11, 1944 |
| 2,371,897 | Knick | Mar. 20, 1945 |
| 2,463,735 | Bedford | Mar. 8, 1949 |
| 2,481,045 | Schroeder | Sept. 6, 1949 |
| 2,505,367 | Shaw | Apr. 25, 1950 |
| 2,525,103 | Sprecher | Oct. 10, 1950 |
| 2,540,646 | Bernard | Feb. 6, 1951 |
| 2,569,297 | Duke et al. | Sept. 25, 1951 |
| 2,593,011 | Cotsworth | Apr. 15, 1952 |
| 2,605,409 | Forbes | July 29, 1952 |
| 2,636,080 | Doba | Apr. 21, 1953 |

FOREIGN PATENTS

| | | |
|---|---|---|
| 112,360 | Sweden | Nov. 14, 1944 |
| 505,899 | Great Britain | May 15, 1939 |
| 510,715 | Great Britain | Aug. 4, 1939 |
| 832,117 | France | Sept. 22, 1938 |
| 845,897 | France | Sept. 4, 1939 |